US010751753B2

(12) United States Patent
Ochi et al.

(10) Patent No.: US 10,751,753 B2
(45) Date of Patent: Aug. 25, 2020

(54) METHOD FOR PRODUCING COATED ARTICLE

(71) Applicant: AGC Inc., Chiyoda-ku (JP)

(72) Inventors: Shuhei Ochi, Chiyoda-ku (JP); Masataka Aikawa, Chiyoda-ku (JP); Shun Saito, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 61 days.

(21) Appl. No.: 15/911,461

(22) Filed: Mar. 5, 2018

(65) Prior Publication Data

US 2018/0185877 A1  Jul. 5, 2018

Related U.S. Application Data

(63) Continuation of application No. PCT/JP2016/076025, filed on Sep. 5, 2016.

(30) Foreign Application Priority Data

Sep. 7, 2015 (JP) .................................. 2015-175723

(51) Int. Cl.
| | |
|---|---|
| *B05D 5/06* | (2006.01) |
| *B05D 7/24* | (2006.01) |
| *B05D 3/02* | (2006.01) |
| *C09D 201/00* | (2006.01) |
| *C09D 127/12* | (2006.01) |
| *B05D 1/06* | (2006.01) |
| *C09D 167/00* | (2006.01) |
| *C09D 133/06* | (2006.01) |
| *C09D 5/03* | (2006.01) |
| *C09D 127/18* | (2006.01) |
| *C09D 167/02* | (2006.01) |
| *C08F 214/24* | (2006.01) |
| *C08K 3/013* | (2018.01) |
| *C08K 3/08* | (2006.01) |

(52) U.S. Cl.
CPC .............. *B05D 5/067* (2013.01); *B05D 1/06* (2013.01); *B05D 3/0254* (2013.01); *B05D 5/06* (2013.01); *B05D 7/24* (2013.01); *C09D 5/035* (2013.01); *C09D 127/12* (2013.01); *C09D 127/18* (2013.01); *C09D 133/06* (2013.01); *C09D 167/00* (2013.01); *C09D 167/02* (2013.01); *C09D 201/00* (2013.01); *B05D 2202/25* (2013.01); *B05D 2506/10* (2013.01); *B05D 2508/00* (2013.01); *B05D 2601/02* (2013.01); *C08F 214/247* (2013.01); *C08K 3/013* (2018.01); *C08K 2003/0812* (2013.01)

(58) Field of Classification Search
None
See application file for complete search history.

(56) References Cited

U.S. PATENT DOCUMENTS

| | | | |
|---|---|---|---|
| 4,544,600 A * | 10/1985 | Kern ........................ | C08J 3/226 427/221 |
| 5,912,283 A | 6/1999 | Hashizume et al. | |
| 6,022,911 A | 2/2000 | Hashizume et al. | |
| 2013/0048917 A1 | 2/2013 | Virtanen et al. | |
| 2013/0196062 A1 | 8/2013 | Wang et al. | |
| 2016/0096975 A1* | 4/2016 | Saito ........................ | C09D 5/03 427/180 |

FOREIGN PATENT DOCUMENTS

| | | |
|---|---|---|
| CN | 1774482 A | 5/2006 |
| DE | 10 2004 034 645 A1 | 2/2006 |
| JP | 53-143630 | 12/1978 |
| JP | 59-501550 | 8/1984 |
| JP | 3-95276 | 4/1991 |
| JP | 8-183137 | 7/1996 |
| JP | 9-71734 | 3/1997 |
| JP | 2004-115696 | 4/2004 |
| JP | 2011-11117 | 1/2011 |
| JP | 2011-12119 | 1/2011 |
| WO | WO 95/21216 A1 | 8/1995 |
| WO | WO 02/087339 A1 | 11/2002 |
| WO | WO 2012/048650 A1 | 4/2012 |
| WO | WO 2015/016185 A1 | 2/2015 |

OTHER PUBLICATIONS

International Search Report dated Nov. 29, 2016 in PCT/JP2016/076025, filed Sep. 5, 2016.

* cited by examiner

*Primary Examiner* — Michael P. Rodriguez
(74) *Attorney, Agent, or Firm* — Oblon, McClelland, Maier & Neustadt, L.L.P.

(57) ABSTRACT

To provide a production method for obtaining a coated article provided with a coating film having excellent weather resistance by using a powder coating material. A method for producing a coated article, which comprises applying a powder coating material comprising a fluororesin (A), a non-fluororesin (B) and a metallic pigment (C) to the surface of a substrate, and heating the substrate having the powder coating material applied, to a temperature of at least the glass transition temperature of the fluororesin (A) and the non-fluororesin (B), followed by cooling, to form a coating film on the substrate surface, and which is characterized in that the content of the metallic pigment (C) is from 0.7 to 23 mass % to the total amount of the powder coating material, the PCI value of the coating film is at least 6, and the flip-flop value is at least 1.2.

10 Claims, No Drawings

METHOD FOR PRODUCING COATED ARTICLE

CROSS-REFERENCE TO RELATED APPLICATIONS

This application is a Continuation of PCT/JP2016/076025, which was filed on Sep. 5, 2016. This application is based upon and claims the benefit of priority to Japanese Application No. 2015-175723, which was filed on Sep. 7, 2015.

TECHNICAL FIELD

The present invention relates to a method for producing a coated article.

BACKGROUND ART

In recent years, global scale environmental destruction such as global warming, ozone layer depletion, acid rain, etc. has become an international problem. There is an urgent need for global environmental pollution countermeasures, and at present, various emissions regulations are enforced in each country. Among them, the problem of discharge of volatile organic compounds (VOC) such as organic solvents into the atmosphere is critical, and therefore, VOC reduction is being advanced under reinforcement of VOC emission regulations.

Heretofore, a coating film has been formed by using a coating material containing an organic solvent, but in promotion for VOC reduction, a powder coating material has now become to be widely used. The powder coating material contains no organic solvent and thus requires no exhaust treatment or waste water treatment at the time of coating, and further can be recovered and reused, whereby the environmental load is extremely low.

In recent years, in various fields such as architecture, automobile, etc., there is a growing demand for a coating film with a hue of metallic tone. Usually for formation of a coating film with a hue of metallic tone, a coating material containing a metallic pigment such as aluminum powder, etc. (hereinafter also referred to as a metallic coating material) is used.

However, in a case where the metallic coating material is a powder coating material, as compared with the case of solvent-type or water-type, the metallic pigment tends to be exposed (bleed out) on the surface of the coating film. Exposure of the metallic pigment deteriorates the appearance of the coating film.

With respect to such problems, for example, a powder coating material composition having the following (1) has been proposed.

(1) A powder coating material composition having 100 parts by weight of a coating material resin powder dry-mixed to from 0.1 to 30 parts by weight of a colored metallic pigment for a powder coating material, in which the surface of the colored metallic pigment having a colored pigment attached on the surface of a base metallic pigment, is covered with a particular polymer and the residual solvent amount is at most 5 mass % (Patent Document 1).

On the other hand, as the powder coating material, an acrylic resin-type powder coating material, a polyester resin-type powder coating material or an epoxy resin-type powder coating material has been mainly used. However, a coating film formed by such a powder coating material is inferior in weather resistance.

With respect to such a problem, for example, a powder coating material composition having the following (2) has been proposed.

(2) A layer separation type powder coating material composition which is a powder coating material obtainable by melt-kneading a mixture comprising from 10 to 50 parts by mass of a fluororesin, from 10 to 90 parts by mass of a polyester resin and from 10 to 50 parts by mass of a pigment, followed by cooling and grinding, and of such a type that when the powder coating material is melted and cured, the fluororesin and the polyester resin will be layer-separated without being compatibilized (Patent Document 2).

In a case where such a layer separation type powder coating material composition is used, it is possible to form, in one-coating operation, a coating film of a two-layer structure comprising a polyester resin layer on the substrate side and a fluororesin layer on the air side, and as the coating film has a fluororesin layer on the air side, it is said to be superior in weather resistance.

PRIOR ART DOCUMENTS

Patent Documents

Patent Document 1: JP-A-09-071734
Patent Document 2: JP-A-2011-012119

DISCLOSURE OF INVENTION

Technical Problem

However, according to studies by the present inventors, the weather resistance of coating films formed by using the powder coating compositions of the above (1) and (2) is not necessarily satisfactory.

An object of the present invention is to provide a method of producing a coated article, whereby by using a powder coating material, it is possible to produce a coated article provided with a coating film excellent in weather resistance.

Solution to Problem

The present inventors have conducted intensive studies and, as a result, have obtained the following findings.

In the case of the powder coating composition (1), although the appearance of the coating film is taken into consideration, orientation of the metallic pigment in the coating film to be formed, is not taken into consideration.

In a case where the metallic coating material is a powder coating material, orientation of the metallic pigment in the coating film to be formed, is likely to be disturbed, as compared with the case of a solvent-type or water-type. If there is disturbance in the orientation of the metallic pigment, the metallic pigment present e.g. at the surface of the coating layer, is susceptible to corrosion. Further, if there is disturbance in the orientation of the metallic pigment, the concealing properties of the coating film tend to be lowered.

If the content of the metallic pigment is increased, the concealing properties will be enhanced, but the amount of the metallic pigment present at the surface of the coating layer will increase, whereby the metallic pigment to be corroded, will be increased, and the weather resistance of the coating film will be further lowered.

In the case of the powder coating material composition of the above (2), a luster pigment or the like is disclosed as the pigment, and an aluminum powder or the like is disclosed as the luster pigment, but like the powder coating material composition of the above (1), no consideration is given to orientation of the metallic pigment in the coating film to be formed. And, according to studies by the present inventors, in a case where a metallic pigment is used as the pigment in the powder coating composition of the above (2), orientation of the metallic pigment tends to be disturbed, and, as described above, the weather resistance of the coating film become to be insufficient.

The present invention is based on the above findings, and it provides a method for producing a coated article, that is summarized as follows.

<1> A method for producing a coated article, which comprises applying a powder coating material comprising a fluororesin (A), a non-fluororesin (B) and a metallic pigment (C) to the surface of a substrate, and heating the substrate having the powder coating material applied, at a temperature of at least the glass transition temperature of the fluororesin (A) and the non-fluororesin (B), followed by cooling to form a coating film on the substrate surface, and which is characterized in that the content of the metallic pigment (C) is from 0.7 to 23 mass % to the total amount of the powder coating material, the PCI value of the coating film is at least 6, and the flip-flop value is at least 1.2, provided that the PCI value is a value obtained by judging the smoothness of the coating film surface by means of smoothness visual judgement standard plates by Powder Coating Institute, and the flip-flop value is a value obtained by "the brightness (25°) at the time of highlight measured at an illumination angle of 25° and a light receiving angle of 0°, based on a direction (0°) perpendicular to the film surface"/"the brightness (75°) at the time of shade measured at an illumination angle of 75° and a light receiving angle of 0°, based on a direction perpendicular to the film surface".

<2> The method for producing a coated article according to <1>, wherein the difference between the SP value of the fluororesin (A) and the SP value of the non-fluororesin (B) (the SP value of the non-fluororesin (B)–the SP value of the fluororesin (A)) is at least 0.4 $(J/cm^3)^{1/2}$.

<3> The method for producing a coated article according to <1> or <2>, wherein the mass ratio (A/B) of the fluororesin (A) to the non-fluororesin (B) in the entire powder coating material is from 90/10 to 10/90.

<4> The method for producing a coated article according to any one of <1> to <3>, wherein the metallic pigment (C) is one having metal particles covered with a covering material.

<5> The method for producing a coated article according to <4>, wherein the SP value of the covering material exceeds the SP value of the fluororesin (A) and is less than the SP value of the non-fluororesin (B).

<6> The method for producing a coated article according to any one of <1> to <5>, wherein the powder coating material further contains a plasticizer (D) having a cyclic hydrocarbon group in the molecule.

<7> The method for producing a coated article according to <6>, wherein the plasticizer (D) is contained in an amount of from 0.1 to 40 parts by mass to 100 parts by mass of the resin component contained in the entire powder coating material.

<8> The method for producing a coated article according to any one of <1> to <7>, wherein the powder coating material further contains fine particles (E) made of at least one member selected from silica, alumina, titania and zinc oxide, and having a specific surface area of from 10 to 500 $m^2/g$ and an average primary particle size in a range of from 0.1 to 100 nm.

<9> The method for producing a coated article according to <8>, wherein the fine particles (E) are contained in an amount of from 0.01 to 10 parts by mass to 100 parts by mass of the resin component contained in the entire powder coating material.

<10> The method for producing a coated article according to any one of <1> to <9>, wherein the substrate having the powder coating material applied, is heated at from 120 to 300° C., and then, cooled by quenching or annealing to from 20 to 25° C.

Advantageous Effects of Invention

According to the method for producing a coated article of the present invention, it is possible to produce a coated article provided with a coating film excellent in weather resistance by using a powder coating material.

DESCRIPTION OF EMBODIMENTS

The following definitions of terms apply throughout the specification including claims.

The "SP value" (solubility parameter) is a cohesive energy density, i.e. a square root value of the evaporation energy per unit volume of 1 molecule, and is an index to show the magnitude of the polarity per unit volume. The SP value was calculated by a Fedros method (literature: see R. F. Fedros, Polym. Eng. Sci., 14 (2) 147 (1974)).

A "melting point" of a resin means a temperature at the melting peak as measured by a differential scanning calorimetry (DSC) method.

A "glass transition temperature" of a resin means a midpoint glass transition temperature as measured by a differential scanning calorimetry method.

A "reactive group" of a resin means a functional group which reacts with a curing agent to induce crosslinking between molecules.

A "fluorine content" in a fluororesin means a proportion (mass %) of fluorine atoms to all atoms (100 mass %) constituting the fluororesin.

A "plasticizer" means a compound which has compatibility with a resin and imparts flexibility to the resin.

The term "dry blend" means that at the time of mixing two or more powders, the two or more powders are mixed without melting the powders, or without adding a solvent.

A "(meth)acrylate" is a generic term for an acrylate and a methacrylate, and the term "(meth)acryl" is a generic term for "acryl" and "methacryl".

A "unit" means a moiety derived from a monomer, which is present in a polymer to constitute the polymer. In the following, as the case requires, a unit derived from an individual monomer will be referred to by a name having "unit" attached to the monomer name.

A "PCI value" is a value obtained by judging the smoothness of the coating film surface by means of smoothness visual judgement standard plates by Powder Coating Institute (PCI). The standard plates are 10 types of from 1 to 10, and the larger the number, the better the smoothness. The smoothness of the coating film surface and the smoothness of the standard plates are visually compared, whereby judgement is made to which standard plate, the smoothness of the coating film surface corresponds.

A "flip-flop value" is a value obtained by "the brightness (25°) at the time of highlight measured at an illumination angle of 25° and a light receiving angle of 0°, based on a direction (0°) perpendicular to the film surface"/"the brightness (75°) at the time of shade measured at an illumination angle of 75° and a light receiving angle of 0°, based on a direction perpendicular to the film surface".

The brightness (25°) at the time of highlight is, in short, the brightness of light in a direction perpendicular to the coating film surface, out of light illuminated and reflected from an angle of 25° to an axis perpendicular to the coating film surface.

The brightness (75°) at the time of shade is, in short, the brightness of light in a direction perpendicular to the coating film surface, out of light illuminated and reflected from an angle of 75° to an axis perpendicular to the coating film surface.

These brightnesses can be measured by an angle color measurement method. For example, they can be measured by using a spectrocolorimeter CM-512m3A manufactured by Konica Minolta, Inc.

Where a numerical limit or range is stated herein, the endpoints are included. Also, all values and subranges within a numerical limit or range are specifically included as if explicitly written out.

As used herein the words "a" and "an" and the like carry the meaning of "one or more."

The powder coating material of the present invention comprises a fluororesin (A), a non-fluororesin (B) and from 0.7 to 23 mass % of a metallic pigment (C). The powder coating material of the present invention may, as the case requires, contain a plasticizer (D), fine particles (E) and/or other additives.

The fluororesin (A) may be a homopolymer or copolymer of a fluoroolefin. In the case of the copolymer, it may be a copolymer of a fluoroolefin with a fluoromonomer other than a fluoroolefin and/or with a monomer having no fluorine atom.

The fluoroolefin is preferably at least one member selected from the group consisting of tetrafluoroethylene (hereinafter referred to also as "TFE"), chlorotrifluoroethylene (hereinafter referred to also as "CTFE"), hexafluoropropylene, vinylidene fluoride and vinyl fluoride, particularly preferably TFE or CTFE. When the fluoroolefin has chlorine atom(s), the glass transition temperature of the fluororesin (A) can be designed to be at least 50° C., and it is possible to suppress blocking of the coating film. Further, to the fluororesin (A), other pigments (F) (in particular, colored organic pigments such as cyanine blue, cyanine green, etc.), etc. to be optionally blended, can easily be dispersed.

As the fluoroolefin, one type may be used alone, or two or more types may be used in combination.

The fluorinated monomer other than a fluoroolefin may, for example, be a fluoroalkyl (alkyl vinyl ether), a perfluoro (alkyl vinyl ether), etc. The fluorinated monomer may have a reactive group.

As the monomer having no fluorine atom, a monomer having a reactive group, and other monomers having no fluorine atom and no reactive group (hereinafter referred to as "other monomers") may be mentioned.

In a case where the monomer having no fluorine atom, has a reactive group, the reactive group is preferably a hydroxy group, a carboxy group or an amino group. Among them, a hydroxy group or a carboxy group is particularly preferred, since the curing rate will be thereby excellent when an isocyanate-type curing agent (especially a blocked isocyanate curing agent) is contained as the curing agent.

The monomer having a hydroxy group may, for example, be allyl alcohol, a hydroxyalkyl vinyl ether (such as 2-hydroxyethyl vinyl ether, 4-hydroxybutyl vinyl ether, cyclohexanediol monovinyl ether, etc.), a hydroxyalkyl allyl ether (such as 2-hydroxyethyl allyl ether, etc.), a vinyl hydroxy alkanoate (such as vinyl hydroxypropionate, etc.), a hydroxyalkyl (meth)acrylate (such as hydroxyethyl (meth) acrylate, etc.), etc.

The monomer having a carboxy group may, for example, be (meth)acrylic acid, a carboxy alkyl vinyl ether, carboxy allyl ether, etc.

Further, in order to bring a carboxy group as a functional group of the copolymer, it is possible, for example, that after obtaining a copolymer comprising units based on a monomer having a hydroxy group, the copolymer is reacted with an acid anhydride to obtain an ester bond and a carboxy group.

The acid anhydride may, for example, be succinic anhydride, glutaric anhydride, itaconic anhydride, anhydrous 1,2-cyclohexanedicarboxylic acid (hexahydrophthalic anhydride), anhydrous cis-4-cyclohexene-1,2-dicarboxylic acid, phthalic anhydride, 4-methylhexahydrophthalic anhydride, 1,8-naphthalic anhydride, maleic anhydride, etc.

As the acid anhydride, succinic anhydride is preferred from the viewpoint of the solubility and easy reactivity with a hydroxy group.

As other monomers, for example, an olefin, a vinyl ether, etc. may be mentioned.

The olefin may, for example, be ethylene, propylene, isobutylene, etc. The vinyl ether may, for example, be a cycloalkyl vinyl ether (such as cyclohexyl vinyl ether (hereinafter referred to also as "CHVE"), etc.), an alkyl vinyl ether (such as nonyl vinyl ether, 2-ethylhexyl vinyl ether, hexyl vinyl ether, ethyl vinyl ether, n-butyl vinyl ether, tert-butyl vinyl ether, etc.), etc.

As such other monomers, from such a viewpoint that the glass transition temperature of the fluororesin (A) can be designed to be at least 50° C., and it is possible to suppress blocking of the coating film, cycloalkyl vinyl ethers are preferred, and CHVE is particularly preferred.

The proportion of units derived from a fluoroolefin in the fluororesin (A) is preferably from 5 to 100 mol %, more preferably from 10 to 90 mol %, particularly preferably from 20 to 80 mol %, in all units (100 mol %) in the fluororesin (A). When the proportion of the fluoroolefin units is at least the above lower limit value, weather resistance of the coating film will be further excellent. When the proportion of the fluoroolefin units is at most 90 mol %, the fluororesin (A) tends to be non-crystalline, whereby it is possible to form a coating film excellent in adhesion and smoothness.

In the fluororesin (A), the proportion of units derived from a monomer having no fluorine atom and having a reactive group, is preferably from 0.5 to 20 mol %, particularly preferably from 1 to 15 mol %, in all units (100 mol %) in the fluororesin (A). When the proportion is at least the above lower limit value, the adhesion to the layer of the resin (B) in the coating film will be excellent. When the proportion is at most the above upper limit value, the scratch resistance of the coating film will be excellent.

The proportion of units derived from other monomers in the fluororesin (A) is preferably from 9.5 to 60 mol %, more preferably from 20 to 60 mol %, particularly preferably from 30 to 50 mol %, in all units (100 mol %) in the fluororesin (A). When the proportion is at least the above lower limit value, the glass transition temperature of the fluororesin (A) will be proper, and the powder coating material can easily be produced. When the proportion is at most the above upper limit value, the adhesion to the layer of the resin (B) in the coating film will be excellent.

The number average molecular weight of the fluororesin (A) is preferably from 3,000 to 50,000, more preferably from 5,000 to 30,000. When the number average molecular weight of the fluororesin (A) is at least the above lower limit value, the coating film will be excellent in water resistance and salt water resistance. When the number average molecular weight of the fluororesin (A) is at most the above upper limit value, the surface smoothness of the coating film will be excellent.

In the present specification, the number average molecular weight and the mass average molecular weight are values obtained as calculated as polystyrene by a gel permeation chromatography (GPC) method.

The hydroxy value of the fluororesin (A) is preferably from 5 to 100 mgKOH/g, more preferably from 10 to 80 mgKOH/g. When the hydroxy value of the fluororesin (A) is at least the above lower limit value, the adhesion between the layer (A) and the layer (B) in the coating film will be excellent. When the hydroxy value of the fluororesin (A) is at most the above upper limit value, cracking resistance of the coating film under cycles between a high temperature of at least 100° C. and a low temperature of at most 10° C., will be excellent.

Measurement of the hydroxy value is conducted in accordance with JIS K1557-1; 2007 (ISO 14900; 2001).

The melting point of the fluororesin (A) is preferably at most 300° C., more preferably at most 200° C., particularly preferably at most 180° C. When the melting point of the fluororesin (A) is at most the above upper limit value, the surface smoothness of the coating film will be excellent. The melting point of the fluororesin (A) is preferably at least 60° C., more preferably at least 70° C., further preferably at least 80° C.

The glass transition temperature of the fluororesin (A) is preferably from 40 to 150° C., more preferably from 45 to 120° C., particularly preferably from 50 to 100° C. When the glass transition temperature of the fluororesin (A) is at least the above lower limit value, it will be easy to produce a powder coating material. When the glass transition temperature of the fluororesin (A) is at most the above upper limit value, the surface smoothness of the coating film will be excellent.

The SP value of the fluororesin (A) is preferably from 16.0 to 20.0 $(J/cm^3)^{1/2}$, more preferably from 16.5 to 19.5 $(J/cm^3)^{1/2}$, particularly preferably from 17.0 to 19.0 $(J/cm^3)^{1/2}$.

The SP value is a value calculated by the following formula by the Fedors method.

$$(SP\ value)=(\Delta H/V)^{1/2}$$

In the formula, $\Delta H$ is the molar heat of vaporization (cal), and V is the molar volume ($cm^3$). As such $\Delta H$ and V, the total molar heat ($\Delta H$) of vaporization and the total molar volume (V) of the atomic groups described in "POLYMER ENGINEERING AND SCIENCE, Vol. 14, No. 2, 151-153 (1974)" can be used.

SP values indicate that those having a small difference in the numerical values, tend to be easily mixed to one another, and those having a large difference in the numerical values tend to be hardly mixed to one another.

As the fluorine resin (A), a fluororesin which can be used as a powder coating material, may be suitably used. Specifically, LUMIFLON 710 or 710F (registered trademark of Asahi Glass Company, Limited), ZEFFLE (trademark of Daikin Industries, Ltd.), Kynar (trademark of Arkema), ZB-F1000 (trademark of Dalian Zebon Co., Ltd.), Etafuron (trademark of Eternal Corp.), or DS203 (trademark of Dongyue Shenzhou Corp.) may be mentioned.

The non-fluororesin (B) is a resin containing no fluorine atom, and, for example, a polyester resin, an acrylic resin, an epoxy resin, a urethane resin, etc. may be mentioned. At least one member selected from the group consisting of a polyester resin, an acrylic resins and an epoxy resin is preferred from such a viewpoint that it is easily phase-separated without being compatible with the fluororesin (A) in the melting and curing process of the powder coating material. Among them, from such a viewpoint that adhesion to a substrate is excellent, and the fluororesin (A) is less likely to be mixed to the layer formed by the non-fluororesin (B), a polyester resin or an acrylic resin is preferred, and a polyester resin is particularly preferred.

In a case where polyvinylidene fluoride (hereinafter referred to also as "PVDF") is used as the fluororesin (A), it is preferred to contain an acrylic resin as the non-fluororesin (B), since the adhesion will be then excellent between the layer (hereinafter referred to also as the "layer (A)") composed mainly of the fluororesin (A) or its cured product, and the layer (hereinafter referred to also as the "layer (B)") composed mainly of the non-fluororesin (B) or its cured product, in the coating film.

The polyester resin is a polymer having units derived from a polycarboxylic acid compound and units derived from a polyhydric alcohol compound, wherein the polycarboxylic acid units and the polyhydric alcohol units are connected by ester bonds. The polyester resin may, optionally, have units other than these two types of units (e.g. units derived from a hydroxycarboxylic acid compound (but, excluding a polycarboxylic acid compound). The polyester resin has at least either a carboxy group or a hydroxy group at a terminal of the polymer chain.

The polycarboxylic acid compound may, for example, be phthalic acid, isophthalic acid, terephthalic acid, naphthalene dicarboxylic acid, trimellitic acid, pyromellitic acid, phthalic anhydride, etc. From such a viewpoint that the cured film will be excellent in weather resistance, isophthalic acid is preferred.

As the polyhydric alcohol compound, from the viewpoint of excellent adhesion to the substrate and flexibility of the cured film, an aliphatic polyhydric alcohol or an alicyclic polyhydric alcohol is preferred, and an aliphatic polyhydric alcohol is more preferred.

The polyhydric alcohol compound may, for example, be ethylene glycol, diethylene glycol, triethylene glycol, 1,2-propanediol, 1,3-propanediol, 1,3-butanediol, 1,4-butanediol, 1,5-pentanediol, neopentyl glycol, spiroglycol, 1,10-decanediol, 1,4-cyclohexanedimethanol, trimethylolethane, trimethylolpropane, glycerol, pentaerythritol, etc.

As the polyhydric alcohol compound, preferred is neopentyl glycol, 1,2-pentanediol, 1,5-pentanediol or trimethylolpropane, and from the viewpoint of easy availability, particularly preferred is neopentyl glycol or trimethylolpropane.

The number average molecular weight of the polyester resin is preferably at most 5,000 from such a viewpoint that it is thereby possible to properly lower the melt viscosity of the coating film. The mass average molecular weight of the polyester resin is preferably from 2,000 to 20,000, particularly preferably 2,000 to 10,000, from such a viewpoint that it is thereby possible to properly lower the melt viscosity of the coating film.

The polyester resin is preferably one having a number average molecular weight of at most 5,000 and a mass average molecular weight of from 2,000 to 20,000, particularly preferably one having a number average molecular weight of at most 5,000 and a mass average molecular weight of from 2,000 to 10,000.

As commercially available products of the polyester resin, "CRYLCOAT (trademark of DAICEL-ALLNEX LTD., the same applies hereinafter) 4642-3", "CRYLCOAT4890-0", "U-Pica Coat (tradename of Japan U-Pica Company Ltd., the same applies hereinafter) GV-250", "U-Pica Coat GV-740", "U-Pica Coat GV-175", "Uralac (tradename of DSM) 1680", etc. may be mentioned.

The acrylic resin is a polymer having units based on a (meth)acrylate.

As the acrylic resin, preferred is one having a reactive group such as a carboxy group, a hydroxy group or a sulfo group. Such an acrylic resin improves the dispersibility of other pigments (F).

The glass transition temperature of the acrylic resin is preferably from 30 to 60° C. When the glass transition temperature is at least the above lower limit value, the coating film will not easily be blocked. Whereas, when it is at most the above upper limit value, the surface smoothness of the coating film will be further excellent.

The number average molecular weight of the acrylic resin is preferably 5,000 to 100,000, particularly preferably from 30,000 to 100,000. When the number average molecular weight of the acrylic resin is at least the above lower limit value, the coating film will not be easily blocked. Whereas, when it is at most the above upper limit value, the surface smoothness of the coating film will be excellent.

The mass average molecular weight of the acrylic resin is preferably 6,000 to 150,000, more preferably from 10,000 to 150,000, particularly preferably from 15,000 to 150,000. When the mass average molecular weight of the acrylic resin is at least the above lower limit value, the coating film is less susceptible to blocking. When the mass average molecular weight of the acrylic resin is at most the above upper limit value, the surface smoothness of the coating film will be excellent.

When the acrylic resin has carboxy groups, the acid value of the acrylic resin is preferably from 150 to 400 mgKOH/g. When the acid value of the acrylic resin is at least the above lower limit value, there will be an effect to improve the dispersibility of other pigments (F). Whereas, when it is at most the above upper limit value, the coating film will be excellent in moisture resistance.

The acrylic resin is obtainable, for example, by a method of polymerizing a (meth)acrylic acid ester such as methyl (meth)acrylate or an ethyl (meth)acrylate by a known radical polymerization method.

As commercially available acrylic resins, "FINEDIC (trademark of DIC Corporation, the same applies hereinafter) A-249", "FINEDIC A-251", "FINEDIC A-266", "ALMATEX (trademark of Mitsui Chemicals, Inc., the same applies hereinafter) PD6200", "ALMATEX PD7310", "SANPEX (trademark of Sanyo Chemical Industries, Ltd.) PA-55", etc. may be mentioned.

The epoxy resin is a compound (prepolymer) having at least two epoxy groups in the molecule. The epoxy resin may further have other reactive groups other than epoxy groups.

The epoxy resin may, for example, be a bisphenol A type epoxy resin, or a bisphenol F type epoxy resin.

As commercially available epoxy resins, "Epikote (trademark of Mitsubishi Chemical Corporation, the same applies hereinafter) 1001", "Epikote 1002", "Epikote 4004P", "EPICLON (trademark of DIC Corporation, the same applies hereinafter) 1050", "EPICLON 3050", "Epotohto (trademark of Nippon Steel & Sumikin Chemical Co., Ltd., the same applies hereinafter) YD-012", "Epotohto YD-014", "Denacol (trademark of Nagase ChemteX Corporation) EX-711", "EHPE3150 (trademark of DAICEL CORPORATION), etc. may be mentioned.

The urethane resin may be a mixture obtained by mixing a polyol (such as acrylic polyol, polyester polyol, polyether polyol, propylene glycol, propylene oxide, etc.) and an isocyanate compound, or a resin obtained by reacting such a polyol with an isocyanate compound, and a mixture composed of a powder polyol (such as acrylic polyol, polyester polyol or polyether polyol) and a powder isocyanate compound, is preferred.

The non-fluororesin (B) does not have a fluorine atom and thus tends to have a SP value larger than the fluororesin (A).

The difference between the SP value of the fluororesin (A) (hereinafter referred to also as "SP value (A)") and the SP value of the non-fluororesin (B) (hereafter referred to also as "SP value (B)") is preferably at least 0.4 $(J/cm^3)^{1/2}$, more preferably from 0.4 to 16 $(J/cm^3)^{1/2}$, further preferably from 0.8 to 14 $(J/cm^3)^{1/2}$, particularly preferably from 1.0 to 12 $(J/cm^3)^{1/2}$.

When the difference in SP value is at least the above lower limit value, by applying a powder coating material comprising the fluororesin (A) and the non-fluororesin (B) to a substrate, followed by heating to at least the glass transition temperature of the fluororesin (A) and the non-fluororesin (B), the fluororesin (A) and the non-fluororesin (B) will be easily melted and phase-separated. When the difference in SP value is at most the above upper limit value, the adhesion between the layer (A) and the layer (B) in the coating film will be excellent.

The SP value of non-fluororesin (B) is preferably from 18.0 to 30.0 $(J/cm^3)^{1/2}$, more preferably from 18.5 to 29.5 $(J/cm^3)^{1/2}$, particularly preferably from 19.0 to 29.0 $(J/cm^3)^{1/2}$.

In a case where the fluororesin (A) contains two or more fluorine resins, the above-mentioned difference in SP value is decided by adopting the largest SP value out of the SP values of the two or more fluororesins, as the SP value (A).

In a case where the non-fluororesin (B) contains two or more resins, the above-mentioned difference in SP value is decided by adopting the smallest SP value out of the SP values of the two or more non-fluororesins, as the SP value (B).

The metallic pigment (C) is composed of metal particles alone or metal particles covered with a covering material. As the metal particles, aluminum particles, nickel particles, stainless steel particles, copper particles, bronze particles, gold particles, silver particles, etc. may be mentioned, and aluminum particles are particularly preferred.

The specific gravity of the metal particles is preferably from 0.1 to 4.0 $g/cm^3$, more preferably from 0.3 to 2.0 $g/cm^3$.

The covering material is preferably at least one member selected from the group consisting of a resin, an aliphatic compound, an aromatic compound and a silane compound.

The resin may, for example, be a phosphoric acid group-containing resin, an acrylic resin, a silicone resin, siloxane, etc. The aliphatic compound may, for example, be a fatty acid, an aliphatic amine, etc. The fatty acid is preferably a long-chain fatty acids having from 4 to 18 carbon atoms, and, for example, oleic acid may be mentioned. The aromatic compound may, for example, be styrene, α-methyl styrene, vinyl toluene, divinyl benzene, divinyl benzene monoxide, allyl benzene, diallyl benzene, etc. The silane compound may, for example, be a silane coupling agent. Among them, an acrylic resin is preferred.

As the method for covering with a covering material, a coating treatment with a resin or the like, or a surface covering chemical conversion treatment by a long-chain fatty acid may be mentioned.

The covering which metal particles have on the surface may be a single layer or a plurality of layers.

The metallic pigment (C) is preferably a pigment having metal particles covered with a covering material. As being covered with a covering material, it will be excellent in efficiency for orientation at the time of being formed into a coating film, and in efficiency for mixing with the powder (P).

The SP value of the covering material at the surface of the covered pigment (the covering material of the outermost layer when the covering is multi-layered) is preferably more than the SP value (A) and less than the SP value (B).

In a case where the SP value of the covering material is within the above range, when a powder coating material is applied, the layer (B) and the layer (A) will be laminated in this order from the substrate side by one-coating operation (one coat), whereby a coating film having the metallic pigment (C) arranged in the vicinity of the interface of these layers will be readily obtainable.

After applying the powder coating material to a substrate, by heating it at a temperature of at least the glass transition temperature of the fluororesin (A) and the non-fluororesin (B), a molten film will be formed. In the molten film, the molten to fluororesin (A) and the molten non-fluororesin (B) are phase separated to form a liquid-liquid interface. At that time, the metallic pigment (C1) covered with a coating material having a SP value of more than the SP value (A) and less than the SP value (B), will move to the liquid-liquid interface. A fluorine atom has high electronegativity as a characteristic inherent to the atom, and the metal atom of the metallic pigment has a cation. Therefore, the metallic pigment (C1) having moved to the liquid-liquid interface will be adsorbed on the surface of the layer of the fluororesin (A), to be in an adsorption equilibrium state. Therefore, the coating film as described above is considered to be easily obtainable by one coating operation.

If the SP value of the covering material is close to the SP value (A) or the SP value (B), there may sometimes be a case where the phase separation or orientation becomes insufficient. Therefore, the SP value of the covering material is preferably larger by at least 0.2 $(J/cm^3)^{1/2}$, more preferably larger by at least 0.4 $(J/cm^3)^{1/2}$, than the SP value (A). Further, it is preferably smaller by at least 0.2 $(J/cm^3)^{1/2}$, more preferably smaller by at least 0.4 $(J/cm^3)^{1/2}$, than the SP value (B). As the difference between the SP value of the covering material, and the SP value (A) or SP value (B), is larger, the metallic pigment (C) tends to be easily oriented at the interface between the layer (B) and the layer (A).

In a case where the fluororesin (A) contains two or more fluororesins, the largest SP value among the SP values of the two or more fluororesins will be adopted as the SP value (A), and in a case where the resin (B) contains two or more resins, the smallest SP value among the SP values of the two or more resins will be adopted as the SP value (B), to set the SP value of the covering material. Further, in a case where the covering material is in a multilayer structure, SP of the covering material at the outermost layer, may be in the above range of the SP value.

As metal particles, thus as the metallic pigment (C), flaky flakes are preferred, since a metallic color hue can thereby be easily developed.

When the metallic pigment (C) is flakes, the average aspect ratio is preferably from 10 to 200, more preferably from 50 to 100.

An "aspect ratio" means a ratio of the maximum length to the thickness of a particle (maximum length/thickness), and the "average aspect ratio" is the average value of aspect ratios of 50 particles randomly selected. The thickness of a particle is measured by an atomic force microscope (hereinafter referred to also as AFM), the maximum length is measured by a transmission electron microscope (hereinafter referred to also as TEM).

The average particle size of the metallic pigment (C) is preferably from 5 to 50 μm, more preferably from 8 to 45 μm. When the average particle size of the metallic pigment (C) is at least the above lower limit value, the underlayer concealing properties of the coating film will be excellent. When the average particle size of the metallic pigment (C) is at most the above upper limit value, luster of the coating film will be excellent.

Measurement of the average particle size is conducted usually by means of a particle size measuring instrument of e.g. a system to capture the potential change at the time of passing through pores, a laser diffraction system, an image determination system, a sedimentation rate measuring system, etc.

From these points, the metallic pigment (C) is preferably one which is flakes and has an average particle size of from 5 to 50 μm and an average aspect ratio of from 10 to 300. More preferred ranges of the average particle size and the average aspect ratio are the same as mentioned above.

The metallic pigment (C) may suitably selected for use from among commercially available metallic pigments depending on the respective SP values of the fluororesin (A) and the non-fluororesin (B). A metallic pigment produced by a known method may otherwise be used. Commercial products of the metallic pigment may, for example, be "PCU1000 ( )", "PCU2000", "PCA9155", "PCR901", "PCF7620A" (manufactured by ECKART), "PCF7601A", "PCF7130A", "PCF7410", "PCF7601", "METAX NEO NME0205T" (manufactured by Toyo Aluminum K.K.), etc.

The plasticizer (D) is preferably a plasticizer having a cyclic hydrocarbon group in the molecule.

When the powder coating material contains the plasticizer (D), it is possible to increase the PCI value and flip flops value of the coating film to be formed. As the plasticizer (D), one type may be used alone, or two or more types may be used in combination.

The cyclic hydrocarbon group may be an alicyclic hydrocarbon group or an aromatic hydrocarbon group. In a case where the plasticizer (D) has a cyclic hydrocarbon group, the compatibility with the resin component will be good, whereby the plasticizer (D) is unlikely to bleed out on the surface of the coating film. Therefore, blocking of the coating film will be suppressed, and at the same time, the surface smoothness of the coating film will be increased to increase the PCI value. Further, the melt viscosity will be lowered by the plasticizer (D), whereby migration of the metallic pigment to the interface will be facilitated, to prevent disturbance in orientation of the metallic pigment (C) and to increase the flip-flop value.

The melting point of the plasticizer (D) is preferably from 60 to 200° C., more preferably from 60 to 180° C., particularly preferably from 70 to 160° C. When the melting point of the plasticizer (D) is at least the lower limit value in the above range, it is possible to more effectively suppress blocking of the coating film. Further, as the plasticizer (D) will be melted to fill a gap in the resin, the surface smoothness will be improved to increase the PCI value. Further, the melt viscosity will be lowered by the plasticizer (D), whereby migration of the metallic pigment to the interface will be facilitated, to suppress disturbance in orientation of the metallic pigment (C) and to increase the flip-flop value.

When the melting point of the plasticizer (D) is at most the upper limit value in the above range, the melt viscosity of the molten film will be lowered, and the surface smoothness will be increased to increase the PCI value. Further, as the melt viscosity will be lowered, the metallic pigment (C) tends to be distributed near the interface between the layer of the fluororesin (A) and the layer of the non-fluororesin (B), and disturbance in orientation of the metallic pigment (C) will be suppressed to increase the flip-flop value.

The molecular weight of the plasticizer (D) is preferably from 200 to 1,000, more preferably from 220 to 980, particularly preferably from 240 to 960. When the molecular weight of the plasticizer (D) is at least the lower limit value in the above range, the volatility tends to be low, and the effect of reducing the melt viscosity of the molten film will be sufficiently exhibited, whereby a coating film excellent in surface smoothness tends to be easily obtainable. When the molecular weight of the plasticizer (D) is at most the upper limit value in the above range, excessive expression of the plasticizing effect will be suppressed, whereby blocking of the coating film will be suppressed.

As the plasticizer (D), from such a viewpoint that the melt viscosity of the molten film tends to be readily lowered, and the coating film will be further excellent in outer appearance and surface smoothness, an ester compound (a carboxylic acid ester, a phosphorous acid ester, etc.) is preferred, and a carboxylic acid ester is more preferred; and from such a viewpoint that blocking of the coating film is further suppressed, 1,4-cyclohexane dimethanol dibenzoate is particularly preferred.

The plasticizer (D) may, for example, be dicyclohexyl phthalate (melting point: 68° C., molecular weight: 330), hexabromocyclododecane (melting point: 180° C., molecular weight: 641), tri-benzoic acid glyceride (melting point: 68° C., molecular weight: 404), tetra-benzoic acid pentaerythritol (melting point: 108° C., molecular weight: 552) or 1,4-cyclohexane dimethanol dibenzoate (melting point: 118° C., molecular weight: 352).

The fine particles (E) are made of at least one member selected from the group consisting of silica (silicon oxide), alumina (aluminum oxide), titania (titanium oxide) and zinc oxide. The fine particles (E) may be made of one member, or may be a mixture of two or more members of such fine particles.

The specific surface area of the fine particles (E) is preferably from 10 to 500 m$^2$/g, more preferably from 15 to 400 m$^2$/g, particularly preferably from 20 to 300 m$^2$/g.

When the specific surface area of the fine particles (E) is at most the upper limit value in the above range, aggregation of the fine particles (E) will be suppressed, whereby seeding on the surface of the coating film tends to be less likely to occur, and surface smoothness of the coating film will be increased to increase the PCI value. Further, aggregation of the metallic pigment (C) will be suppressed by the fine particles (E), whereby disturbance in orientation of the metallic pigment (C) will be suppressed to increase the flip-flop value.

When the specific surface area of the fine particles (E) is at least the lower limit value in the above range, the strength of the coating film will be improved, and cracking tends to be less likely to occur. Further, bending processability will be improved.

The average primary particle size of the fine particles (E) is preferably from 0.1 to 100 nm, more preferably from 0.5 to 90 nm, particularly preferably from 1.0 to 80 nm.

When the average primary particle size of the fine particles (E) is at least the lower limit value in the above range, aggregation of the fine particles (E) will be suppressed, whereby seeding on the surface of the coating film tends to be less likely to occur, and the surface smoothness of the coating film tends to be increased to increase the PCI value. Further, disturbance in orientation of the metallic pigment (C) will be suppressed by suppression of aggregation of the metallic pigment by the fine particles (E), whereby the flip-flop value will be increased.

When the average primary particle size of the fine particles (E) is at most the upper limit value in the above range, the strength of the coating film will be improved, and cracking tends to be less likely to occur. Further, bending processability will be improved.

In this specification, the specific surface area of the fine particles (E) means the specific surface area obtained by the BET method. Further, the average primary particle size of the fine particles (E) is a median diameter measured by a particle size distribution meter using a laser diffraction method.

The fine particles (E) are preferably surface-treated with an organic silicon compound. When surface-treated with an organic silicon compound, the surface of the fine particles (E) will be hydrophobized to have negative triboelectric chargeability, and the powder coating material containing the fine particles (E) will be suitable for corona-type electrostatic powder coating.

The organic silicon compound may, for example, be methyltrichlorosilane, dimethyldichlorosilane, or trimethylchlorosilane.

The content of the organic silicon compound to 100 mass % of the fine particles (E) is preferably from 0.01 to 5.0 mass %, more preferably from 0.5 to 3.0 mass %.

Other additives include, for example, a curing agent, a curing aid, a pigment other than the metallic pigment (C), an ultraviolet absorber, a light stabilizer (a hindered amine light stabilizers, etc.), a matting agent, a surfactant, a leveling agent, a surface modifier, a degassing agent (having an effect to discharge out of the coating film, air included in the powder, or a blocking agent, moisture or the like emerging from the curing agent, so that such gas will not remain inside the coating film; and it is usually solid, but becomes to have a very low viscosity when melted), a filler, a heat stabilizer, a thickener, a dispersing agent, an antistatic agent, a rust inhibitor, an anti-fouling agent, a low pollution treatment agent, etc.

In a case where the fluororesin (A) and the non-fluororesin (B) in the powder coating material have crosslinkable groups, by incorporating a curing agent, it is possible to cure the coating film to further improve the weather resistance, water resistance, chemical resistance, heat resistance, etc.

As the curing agent, a blocked isocyanate of e.g. hexamethylene diisocyanate trimer, or its emulsified dispersion, a melamine resin such as methylated melamine, methylolated melamine or butylolated melamine, an urea resin such as methylated urea or butylated urea, etc. may be mentioned.

The mass ratio ((A)/(B)) of the fluororesin (A) to the non-fluororesin (B) in the entire powder coating is preferably from 90/10 to 10/90, more preferably from 80/20 to 20/80, particularly preferably from 40/60 to 20/80. When (A)/(B) is within the above range, the weather resistance of the coating film will be excellent, and it is possible to suppress the cost for the coating film.

The content of the metallic pigment (C) in the entire powder coating material is preferably from 0.7 to 20 mass %, more preferably from 1 to 15 mass %, particularly preferably from 1 to 9 mass %.

The content of the metallic pigment (C) to the total amount of the powder coating material is equal to the content of the metallic pigment (C) to the mass of the coating film to be formed. When the content of the metallic pigment (C) is at least the lower limit value in the above range, in the coating film to be formed, incidence of light into the layer (B) and the accompanying deterioration of the layer (B) will be sufficiently suppressed by the metallic pigment (C) arranged in the vicinity of the interface between the layer (A) and the layer (B), whereby the weather resistance of the coating film will be excellent. Further, the coating film will be excellent also in metallic color hue and concealing properties. When the content of the metallic pigment (C) is at most the upper limit value in the above range, the metallic pigment (C) existing in the vicinity of the surface layer of the coating film will be less, whereby bleeding out tends to be less likely to occur. Therefore, it is possible to suppress corrosion of the metallic pigment (C), and the weather resistance of the coating film will be excellent. Further, the metallic pigment (C) present near the interface with the substrate tends to be less, whereby adhesion of the coating film to the substrate will be excellent.

Here, in a case where the metallic pigment (C) is covered with a covering material, its content is an amount including the covering material.

In a case where the powder coating material contains a plasticizer (D), the content of the plasticizer (D) in the entire powder coating material is preferably from 0.1 to 40 parts by mass, more preferably from 0.5 to 35 parts by mass, particularly preferably from 1 to 30 parts by mass, to 100 parts by mass of the resin component contained in the entire powder coating material.

When the content of the plasticizer (D) is within the above range, it is possible to form a coating film which is excellent in surface smoothness and has no defect such as cissing on the outer appearance of the coating film. When the content of the plasticizer (D) is at least the lower limit value in the above range, the effect of reducing the melt viscosity of the molten film can be sufficiently exhibited, and it is possible to obtain a coating film excellent in surface smoothness and outer appearance. When the content of the plasticizer (D) is at most the upper limit value in the above range, blocking of the coating film will be suppressed.

In a case where the powder coating material contains fine particles (E), the content of the fine particles (E) in the entire powder coating material is preferably from 0.01 to 10 parts by mass, more preferably from 0.05 to 9 parts by mass, particularly preferably from 0.1 to 8 parts by mass, to 100 parts by mass of the resin component contained in the entire powder coating material.

When the content of the fine particles (E) is within the above range, it is possible to form a coating film which has no appearance defect such as seeding or cissing and which is excellent also in smoothness of the surface. When the content of fine particles (E) is at least the lower limit value in the above range, smoothness of the surface of the coating film will be good, and when it is at most the upper limit value, smoothness of the surface of the coating film becomes good, and at the same time, a problem of seeding or cissing in the coating film will be resolved so that the appearance becomes good. This is believed to be due to the following reason.

That is, in a case where the powder coating material contains the fine particles (E), at least part of the fine particles (E) will be present at the surface of the respective particles of the powder constituting the powder coating material. Therefore, it is considered that frictional resistance between the particles will be reduced, and slippage between the particles will be improved. As a result, particles are considered to be densely filled during coating, to form a coating film excellent in surface smoothness. Further, an appearance defect such as seeding or cissing is considered to be suppressed, since the amount of the fine particles (E) is appropriate.

In a case where the powder coating material contains a curing agent, the content of the curing agent in the entire powder coating material is preferably from 1 to 55 parts by mass, particularly preferably from 3 to 55 parts by mass to 100 parts by mass of the resin component contained in the entire powder coating.

When the curing agent is a blocked isocyanate curing agent, the content of the blocked isocyanate curing agent in the entire powder coating material is in such an amount that the molar ratio of isocyanate groups to hydroxy groups in the powder coating material would be preferably from 0.05 to 1.5, particularly preferably from 0.8 to 1.2. When the molar ratio is at least the lower limit value in the above range, the degree of curing of the coating material will be high, and the coating film will be excellent in the hardness, chemical resistance, etc. When the molar ratio is at most the upper limit value in the above range, the coating film is less likely to become brittle, and yet, the coating film will be excellent in the heat resistance, chemical resistance, moisture resistance, etc.

In a case where the powder coating material contains a curing catalyst, the content of the curing catalyst in the entire powder coating material is preferably from 0.0001 to 10.0 parts by mass to 100 parts by mass of the resin component contained in the entire powder coating material. When the content of the curing catalyst is at least the lower limit value in the above range, the catalytic effect tends to be sufficiently obtained. When the content of the curing catalyst is at most the upper limit value in the above range, a gas such as air included in the powder coating material in the process of melting and curing the powder coating material, tends to be easily discharged, and deterioration of the heat resistance, weather resistance and water resistance of the coating film to be caused by the remaining gas, will be less.

As the powder coating material of the present invention, the following (i), (ii) or (iii) is preferred.

(i) A powder coating material comprising the fluororesin (A), the non-fluororesin (B) and from 0.7 to 23 mass % of the metallic pigment (C), wherein the difference between the SP value of the fluororesin (A) and the SP value of the non-fluororesin (B) is at least 0.4 $(J/cm^3)^{1/2}$.

(ii) A powder coating material comprising the fluororesin (A), the non-fluororesin (B), from 0.7 to 23 mass % of the metallic pigment (C) and the plasticizer (D).

(iii) A powder coating material comprising the fluororesin (A), the non-fluororesin (B), from 0.7 to 23 mass % of the metallic pigment (C) and the fine particles (E).

In the powder coating materials (i) to (iii), preferred types of the fluorine resin (A), the non-fluororesin (B) and the metallic pigment (C), respectively, and their preferred contents, as well as a preferred value of the difference between the above-mentioned SP values, are the same as mentioned above.

In the powder coating materials (i) to (iii), the fluororesin (A) and the non-fluororesin (B) may, respectively, be contained in the same particles, or may be contained in different particles. The powder coating materials (i) to (iii) preferably comprise particles containing the fluororesin (A), and particles containing the non-fluororesin (B) and not containing the fluororesin (A). The particles containing the fluororesin (A) may contain or may not contain the non-fluororesin (B).

In powder coating materials (i) to (iii), the metallic pigment (C) is preferably present as independent particles. When the metallic pigment (C) is present as independent particles separately from the particles containing the fluororesin (A) and the non-fluororesin (B), it will be easy to increase the PCI value and flip flops value of the coating film.

The powder coating material of the present invention is particularly preferably one which is the powder coating material (ii) or (iii) wherein the difference between the SP value of the fluororesin (A) and the SP value of the non-fluororesin (B) is at least 0.4 $(J/cm^3)^{1/2}$. That is, the following (ii-1) or (iii-1) is particularly preferred.

(ii-1) A powder coating material comprising the fluororesin (A), the non-fluororesin (B), from 0.7 to 23 mass % of the metallic pigment (C) and the plasticizer (D), wherein the difference between the SP value of the fluororesin (A) and the SP value of the non-fluororesin (B) is at least 0.4 $(J/cm^3)^{1/2}$.

(iii-1) A powder coating material comprising the fluororesin (A), the non-fluororesin (B), from 0.7 to 23 mass % of the metallic pigment (C) and the fine particles (E), wherein the difference between the SP value of the fluororesin (A) and the SP value of the non-fluororesin (B) is at least 0.4 $(J/cm^3)^{1/2}$.

Here, a preferred range of the difference between the respective SP values is the same as mentioned above.

In the powder coating material of the present invention, a component which can reduce the difference between the SP value of the fluororesin (A) and the SP value of the non-fluororesin (B), may be contained or may not be contained, provided that even when contained, it is contained within a range where the difference between the SP values would be maintained to be at least 0.4 $(J/cm^3)^{1/2}$. As such a component, a component may be mentioned which facilitates compatibility of the fluororesin (A) and the non-fluororesin (B) to inhibit phase separation of the coating film, and specifically, a binder, a compatibilizing agent, a surfactant, etc. may be mentioned.

In a case where such a component is contained within the above-mentioned range, orientation of the metallic pigment (C) in the coating film will be uniform, the metallic pigment (C) tends to be less likely to be exposed on the outermost layer of the coating film, and the weather resistance and concealing properties of the coating film will be improved.

As a method for producing a powder coating material, the fluororesin (A), the non-fluororesin (B) and the metallic pigment (C) are mixed for its production. As the case requires, a plasticizer (D), fine particles (E) and other additives may be mixed.

In a case where the plasticizer (D), the fine particles (E) and other additives are used, they may be added at the time of mixing the fluororesin (A), the non-fluororesin (B) and the metallic pigment (C), or to a mixture thereof. Otherwise, the plasticizer (D), the fine particles (E) and/or other additives may be added, in advance, to either one or all of the fluororesin (A), the non-fluororesin (B) or a mixture thereof. In that case, the fluororesin (A), the non-fluororesin (B) or a mixture thereof, having the plasticizer (D), the fine particles (E) and/or other additives added, may be, as the case requires, molded into e.g. pellets, followed by pulverization to a proper size, for uniform composition of the powder coating material or for ease in handling.

The mixing method may be dry blending, or may be one wherein all components are melt-kneaded, followed by pulverization. Otherwise, a part of the components may be melt-kneaded and pulverized, and then mixed with the remaining components by dry blending.

Specifically, a method of mixing the fluororesin (A), the non-fluororesin (B) and the metallic pigments (C) by dry blending all at once or sequentially at intervals, or a method of mixing by dry blending a mixture obtained by preliminarily mixing the fluororesin (A) and the non-fluororesin (B), with the metallic pigment (C), may be mentioned.

The metallic pigment (C) is preferably mixed by dry blending, since there is a possibility that the particle shape is destroyed by melt-kneading.

The apparatus to be used for mixing may, for example, be a high speed mixer, a V type mixer, an inverting mixer, etc.

The apparatus to be used for melt-kneading may, for example, be an uniaxial extruder, a biaxial extruder, a planetary gear or the like. The kneaded product is preferably, after cooling, formed into pellets.

The apparatus to be used for pulverization may be a pulverizer such as a pin mill, a hammer mill or a jet mill. The apparatus to be used for dry blending may, for example, be a high speed mixer, a double cone mixer, a kneader, a tumbler mixer, a mixing shaker, a drum shaker, a rocking shaker, etc.

In order to remove a powder with a particle size being too large or a powder with a particle size being too small, it is preferred to conduct classification after the pulverization. In the classification, it is preferred to remove at least either particles with a particle size being less than 10 µm or particles with a particle size exceeding 100 µm.

The classification method may, for example, be a sieving method, an air classification method, etc.

The average particle size of the powder coating material is preferably from 25 to 50 µm by a 50% average volume particle size distribution.

In the method for producing a coated article of the present invention, the powder coating material is applied to a substrate surface, and the substrate coated with the powder coating material is then heated at a temperature of at least the glass transition temperature of the fluororesin (A) and the non-fluororesin (B), followed by cooling, to form a coating film on the substrate surface. Thus, a coated article comprising the substrate and the coating film formed on the substrate surface, is obtained.

The substrate is not particularly limited, and may, for example, be an inorganic material, an organic material, an organic-inorganic composite material, etc. The inorganic material may, for example, be concrete, natural stone, glass, metal (iron, stainless steel, aluminum, copper, brass, titanium, etc.), etc. The organic material may, for example, be plastic, rubber, adhesive, wood, etc. The organic-inorganic composite material may, for example, be fiber-reinforced plastic, resin-reinforced concrete, fiber-reinforced concrete, etc.

Among these, metal is preferred, and aluminum is particularly preferred. A substrate made of aluminum is excellent in corrosion resistance and light in weight, and has an excellent performance in application as a building material, such as an exterior member.

The shape, size, etc. of the substrate, are not particularly limited.

Examples of the substrate include exterior members for buildings such as composite panels, curtain wall panels, frames for curtain walls, window frames, etc., automotive members such as tire wheels, construction machinery, frames of motorcycles, etc.

As the method for applying the powder coating material to a substrate (coating method), a known method may be mentioned such as an electrostatic coating method, an electrostatic spraying method, an electrostatic dipping method, a misting method, a flow immersion method, a blowing method, a spraying method, a melt spraying method, or a plasma spraying method. Among them, from such a viewpoint that the obtainable coating film will be excellent in surface smoothness, and the coating film will be excellent in concealing properties, an electrostatic coating method using a powder coating gun is preferred.

The powder coating gun for use in the electrostatic coating method may, for example, be a corona charging type coating gun or a triboelectrification type coating gun. The corona charging type coating gun is one to spray the powder coating material by subjecting it to corona discharge treatment. The triboelectrification type coating gun is one to spray the powder coating material by subjecting it to triboelectrification treatment.

Coating conditions are suitably selected from known conditions depending upon the types of the fluororesin (A) and the non-fluororesin (B).

By heating the substrate having the powder coating material applied, at a temperature of at least the glass transition temperature of the fluororesin (A) and the non-fluororesin (B), the fluororesin (A) and the non-fluororesin (B) will be melted to form a smooth coating film.

The heating of the substrate having the powder coating material applied, may be at the same time as the application of the powder coating material to the substrate, or after the application, or the application and heating of the powder coating material may be repeated.

In a case where the powder coating material contains a curing agent, substantially at the same time as the powder coating material is heat-melted, the curing reaction of reactive components in the composition may begin, and therefore, in such a case, melt-heating of the powder coating material is conducted substantially at the same time as deposition of the powder coating material to the substrate, or the melt-heating of the powder coating material is conducted after deposition of the powder coating material to the substrate.

The heating temperature and heating time are suitably set depending upon the types and composition of the raw material components of the powder coating material, the desired thickness of the coating film, etc. The heating temperature is not particularly limited so long as it is a temperature of at least the glass transition temperature of the fluororesin (A) and the non-fluororesin (B), but, it is preferably from 120 to 300° C., more preferably from 140 to 250° C., particularly preferably from 150 to 220° C.

The heating time is preferably from 2 to 60 minutes, more preferably from 5 to 50 minutes, particularly preferably from 10 to 40 minutes. In a case where the powder coating material does not contain a curing agent, it is more preferably from 5 to 60 minutes, particularly preferably from 10 to 50 minutes. When the heating time is at least the above lower limit value, the metallic pigment (C) will be well oriented at the liquid-liquid interface (the interface between the layer (A) and the layer (B)) in the molten film. When the heating time is at most the above upper limit value, the reaction of the curing agent will proceed whereby adhesion will be excellent.

Cooling after the heating may be conducted so as to be cooled to room temperature (20 to 25° C.), and may be either quenching or annealing, but annealing is preferred in that the coating film is thereby less likely to be peeled from the substrate.

In the method for producing a coated article of the present invention, the number of coating times including the application of the powder coating material to a substrate, followed by heating and cooling, may be once or may be conducted dividedly in a plurality of times. To be conducted dividedly in a plurality of times, the operation is preferably conducted in a plurality of times in such a coating amount that the thickness of the coating film in one operation would correspond to from 10 to 30 μm. If the amount of coating at once is large, the layer of the powder to be formed will be thick, whereby disturbance in orientation of the metallic pigment (C) tends to occur in the powder layer, and such disturbance is likely to be reflected when formed into a coating film. When the coating amount is at most the upper limit value in the above range, disturbance in orientation of the metallic pigment (C) is less likely to occur. When the coating amount is at least the lower limit value in the above range, variation in film thickness will be less, and the metallic pigment (C) can be uniformly oriented.

As described above, a coating film having a PCI value of at least 6 and a flip-flop value of at least 1.2 is obtainable. The PCI value of the coating film is preferably at least 7, more preferably at least 8.

The flip-flop value of the coating film is preferably at least 1.2, more preferably at least 1.3.

When the PCI value and the flip-flop value are at least the respective lower limit values, the weather resistance of the coating film will be excellent, and the concealing properties will also be good. There is no upper limit for the PCI value and the flip-flop value of the coating film, but usually, they are preferably at most 10 and at most 3.0, respectively.

The PCI value and the flip-flop value of the coating film may be adjusted by e.g. the difference between the SP values, the content of the plasticizer (D) or fine particles (E) in the entire powder coating material, the type of the metallic pigment (C) (specific gravity of metal particles, SP value of the covering material, etc.), the melt viscosity, etc. For example, the larger the difference between the SP value of the covering material and the SP value (A) or the SP value (B), or the larger the difference in the SP value between resins, disturbance in orientation of the metallic pigment (C) tends to be less likely to occur, and the PCI value or flip-flop value tends to be at least the above-mentioned lower limit value. Further, when the content of the plasticizer (D) or fine particles (E) is within the above-mentioned preferred range, the PCI value or flip-flop value tends to be at least the above-mentioned lower limit value.

The reason as to why the weather resistance of the coating film is excellent, is considered to be as follows.

If the metallic pigment (C) is present in the vicinity of the surface layer of the coating film, the surface smoothness of the coating film is impaired, whereby the PCI value decreases. In a coating film with a PCI value being at least the above-mentioned lower limit value, the metallic pigment (C) present in the vicinity of the surface layer of the coating film is less.

Further, such a phenomenon that the brightness and color tone look different depending on the viewing angle, is called a flip-flop phenomenon, and the hue of metallic tone is evaluated by comparing the brightness of the reflected components from light sources at different angles. Basically the stronger the hue of metallic tone is, the stronger the specular reflection component becomes, and therefore, the brightness of a reflective component in a direction perpendicular to the coating film surface is strong when the illumination angle is 25°, and it becomes weak when the illumination angle is 75°. Therefore, as the flip-flop value is larger, the hue of the metallic tone can be evaluated to be stronger. If there is disturbance in orientation of the metallic pigment (C) in the coating film, or the metallic pigment (C) is present in the vicinity of the surface layer of the coating film, the hue of the metallic tone weakens. Therefore, in a coating film with a flip-flop value being at least the above-mentioned lower limit value, disturbance in orientation of the metallic pigment (C) is less, and further the metallic pigment (C) present in the vicinity of the surface layer of the coating film is less.

From these points, it is considered that in the coating film wherein the PCI value and the flip-flop value are at least the above-mentioned respective lower limit values, the metallic pigment (C) is mainly localized in the vicinity of the interface of the layer (A) and the layer (B), and further, disturbance in orientation of the metallic pigment (C) is less.

Thus, it is considered possible to obtain the excellent weather resistance, since the layer (A) is present at the outermost layer of the coating film, the metallic pigment (C) is mainly localized in the vicinity of the interface of the layer (A) and the layer (B), the metallic pigment (C) present in the vicinity of the surface layer is less, disturbance in orientation of the metallic pigment (C) is less, and the content of the metallic pigment (C) is within the above-mentioned range. That is, the layer (A) is excellent in weather resistance, since it is composed of the fluororesin (A). Further, since the metallic pigment (C) which is present near the surface layer of the coating film, or which is likely to bleed out, is less, the metallic pigment (C) is less likely to be corroded. Further, since the metallic pigment (C) is oriented in the vicinity of the interface of the layer (A) and the layer (B), the incidence of light to the lower side layer (B) is suppressed, whereby deterioration of the layer (B) is suppressed.

The water contact angle at the surface of the coating film is preferably from 1 to 55 degrees, particularly preferably from 3 to 50 degrees. When the water contact angle is at least the above lower limit value, the coating film is less likely to be eroded by an organic acid component derived from feces of birds or dead insects, and generation of mold on the surface layer of the coating film will also be suppressed (generation of mold tends to lead to poor appearance). When the water contact angle is at most the above upper limit value, the antifouling properties will be excellent.

The thickness of the coating film is not particularly limited, but is preferably from 20 to 1,000 µm, more preferably from 20 to 500 µm, further preferably from 20 to 300 µm. In such an application as a member of a high-rise building, such as an aluminum curtain wall, from 20 to 90 µm is preferred. In an application where weather resistance is highly required, such as an outdoor unit of an air conditioner installed on the coast, a pole for a traffic signal, a signal label, etc., from 100 to 200 urn is preferred.

EXAMPLES

Now, the present invention will be described in detail with reference to Examples. However, the present invention is not limited to these Examples.

Among the following Ex. 1 to 16, Ex. 1 to 10 are Examples of the present invention, and Ex. 11 to 16 are Comparative Examples. The materials used in the respective Ex. are shown below. Further, in the following Tables 1 to 5, "-" means that the relevant component is not contained, or the relevant evaluation is not conducted.

[Materials Used]

<Fluororesin (A)>

Fluororesin (A-1): A copolymer of chlorotrifluoroethylene (CTFE)/cyclohexyl vinyl ether (CHVE)/4-hydroxybutyl vinyl ether (HBVE)=50/35/15 (molar ratio), obtained in the following Production Example 1. The fluorine resin (A-1) had a SP value of 18.4 $(J/cm^3)^{1/2}$, a number average molecular weight of 12,000, and a fluorine content of 25 mass %.

Fluororesin (A-2): A copolymer of CTFE/tert-butyl vinyl ether (t-BuVE)/HBVE/vinyl pivalate (VPV)=50/11/4/35 (molar ratio), obtained in the following Production Examples 2. The fluorine resin (A-2) had a SP value of 17.8 $(J/cm^3)^{1/2}$, a number average molecular weight of 12,000, and a fluorine content of 25 mass %.

Fluororesin (A-3): PVDF (manufactured by Dongyue Shenzhou Corp., PVDF DS203). Fluororesin (A-3) had a SP value of 17.6 $(J/cm^3)^{1/2}$, a number-average molecular weight of 270,000, and a fluorine content of 33 mass %.

Production Example 1: Production of Fluororesin (A-1)

Into a stainless steel autoclave having an inner volume of 250 mL and equipped with a stirrer, 51.2 g of CHVE, 13.3 g of HBVE, 55.8 g of xylene, 15.7 g of ethanol, 1.1 g of potassium carbonate, 0.7 g of a 50 mass % xylene solution of tert-butyl peroxypivalate (PBPV) and 63.0 g of CTFE were introduced. Then, the temperature was gradually raised, and after reaching 55° C., held for 20 hours. Then, the temperature was raised to 65° C. and kept for 5 hours. Then, after cooling, filtering was conducted to remove the residue and to obtain the fluororesin (A-1).

Production Example 2: Production of Fluororesin (A-2)

Into a stainless steel autoclave having an inner volume of 250 mL and equipped with a stirrer, 10.4 g of t-BuVE, 13.2 g of HBVE, 38.5 g of VPV, 55.0 g of xylene, 15.7 g of ethanol, 1.1 g of potassium carbonate, 0.7 g of a 50 mass % xylene solution of PBPV and 63.0 g of CTFE were introduced. Then, the temperature was gradually raised, and after reaching 55° C., held for 20 hours. Then, the temperature was raised to 65° C., and kept for 5 hours. Then, after cooling, filtration was conducted to remove the residue and to obtain the fluororesin (A-2).

<Polyester resin (B)>

Polyester resin (B-1): "CRYLCOAT 4890-0", the number average molecular weight (Mn) was 2,500, and the SP value was 22.8 $(J/cm^3)^{1/2}$.

Polyester resin (B-2): "U-Pica Coat GV-740", the number average molecular weight (Mn) was 3,700, and the SP value was 28.8 $(J/cm^3)^{1/2}$.

Acrylic resin (B-3): "ARUFON (manufactured by Toagosei Co., Ltd., trademark) UH-2170", the number-average molecular weight (Mn) was 15,500, and the SP value was 18.8 $(J/cm^3)^{1/2}$.

<Metallic Pigment (C)>

Metallic pigment (C-1): "PCF7620A" (manufactured by Toyo Aluminum K.K.). Covering material: acrylic resin (SP value: 21.8 $(J/cm^3)^{1/2}$), average particle size: 18 µm, aspect ratio: 54.5.

Metallic pigment (C-2): "PCF7410" (manufactured by Toyo Aluminum K.K.). Covering material: acrylic resin (SP value: 21.8 $(J/cm^3)^{1/2}$), average particle size: 28 µm, aspect ratio: 35.

Metallic pigment (C-3): "41-0310" (manufactured by BASF). Covering material: stearic acid (SP value: 18.2 $(J/cm^3)^{1/2}$), average particle size: 9 µm, aspect ratio: 300.

<Plasticizer (D)>

Plasticizer (D-1): "Benzoflex 352" (manufactured by Eastman Chemical Company), 1,4-cyclohexane dimethanol dibenzoate, molecular weight: 352, melting point: 118° C.

<Fine Particles (E)>

Fine particles (E-1): "AEROSIL (trademark of Evonik) R972", silica fine particles, surface area by BET method: 110 $m^2/g$, average primary particle size: 16 nm.

<Additives>

Curing agent: "VESTAGON (registered trademark of Evonik) B-1530". Blocked isocyanate curing agent, reaction temperature: 160° C.

Curing catalyst: dibutyl tin dilaurate solution in xylene (10,000 fold diluted product).

Degassing agent: benzoin.

Surface controlling agent A: Trademark of BYK Chemie: BYK-360P (polyacrylate powder).

Surface controlling agent B: Trademark of BYK Chemie: CERAFLOUR 960 (micronized modified amide wax, melting point: 145° C.).

Production Examples 3 to 11: Production of Powders (X-1) to (X-4), (Y-1) to (Y-4), (P-1)

The components shown in Tables 1 to 3 were mixed in amounts (unit: parts by mass) shown in Tables 1 to 3 for from about 10 to 30 minutes by means of a high speed mixer (manufactured by Yu Chi Machinery Co., Ltd.) to obtain a powdery mixture. The mixture was melt-kneaded at a barrel set temperature of 120° C. by means of a biaxial extruder (16 mm extruder manufactured by Thermo Prism), to obtain pellets. The pellets were pulverized at room temperature by means of a pulverizer (manufactured by Fritsch Co., Ltd. product name: Rotor Speed Mill P14) and classified by a 150 mesh, to obtain powder (X-1) to (X-4), (Y-1) to (Y-4) and (P-1) having an average particle size of about 40 µm. The amount of each component shown in Tables 1 to 3 is the value of the pure content of the component.

TABLE 1

|  |  | Powder (X) | | | |
|---|---|---|---|---|---|
|  |  | X-1 | X-2 | X-3 | X-4 |
| Fluororesin (A) | A-1 | 72.3 | — | — | 75 |
|  | A-2 | — | 63.0 | — | — |
|  | A-3 | — | — | 91 | — |
| Plasticizer (D) | D-1 | 3.6 | 3.2 | 4.5 | — |
| Additives | Curing agent | 19.3 | 29.1 | — | 20 |
|  | Curing catalyst | 0.0008 | 0.0008 | — | 0.0008 |
|  | Degassing agent | 0.5 | 0.5 | 0.5 | 0.5 |
|  | Surface controlling agent A | 1.4 | 1.4 | 1.7 | 1.5 |
|  | Surface controlling agent B | 2.9 | 2.9 | 2.3 | 3 |

TABLE 2

|  |  | Powder (Y) | | | |
|---|---|---|---|---|---|
|  |  | Y-1 | Y-2 | Y-3 | Y-4 |
| Non-fluororesin (B) | B-1 | 78.4 | — | — | 81.6 |
|  | B-2 | — | 78.4 | — | — |
|  | B-3 | — | — | 78.4 | — |
| Plasticizer (D) | D-1 | 3.9 | 3.9 | 3.9 | — |
| Additives | Curing agent | 11.5 | 11.5 | 11.5 | 12 |
|  | Curing catalyst | 0.00092 | 0.00092 | 0.00092 | 0.00096 |
|  | Degassing agent | 0.6 | 0.6 | 0.6 | 0.6 |
|  | Surface controlling agent A | 1.7 | 1.7 | 1.7 | 1.8 |
|  | Surface controlling agent B | 3.8 | 3.8 | 3.8 | 4 |

|  |  | Powder (P) P-1 |
|---|---|---|
| Fluororesin (A) | A-1 | 20.8 |
| Non-fluororesin (B) | B-1 | 48.4 |
| Plasticizer (D) | D-1 | 3.5 |
| Additives | Curing agent | 22.2 |
|  | Curing catalyst | 0.001 |
|  | Degassing agent | 0.7 |
|  | Surface controlling agent A | 1.5 |
|  | Surface controlling agent B | 3.0 |

Production Example 12: Production of Powder (X-5)

On the particle surface of the powder (X-1), metallic pigment (C-1) was adhered in the same manner as in Example 1 disclosed in JP-A-2004-175813), to produce a powder (X-5).

Ex. 1 to 16

(Production of Powder Coating Material)

The powders shown in Tables 4 and 5 (powder (X), powder (Y), powder (P), metallic pigment (C), fine particles (G)) were dry-blended in amounts (unit: parts by mass) shown in Tables 4 and 5, to obtain a powder coating material. The dry-blending was carried out by mixing by means of a spatula.

(Preparation and Evaluation of Test Specimen)

Using the obtained powder coating material, electrostatic coating was applied on one surface of an aluminum plate (substrate) subjected to chromate treatment, by means of an electrostatic coating machine equipped with a powder coating gun (manufactured by Onoda Cement Co., Ltd., trade name: GX3600C) and held in a 200° C. atmosphere for 20 minutes, and then left to cool to room temperature to obtain an aluminum plate having a coating film (cured film) with a thickness of from 55 to 65 µm. This was used as a test specimen, and the following evaluations were conducted. The results are shown in Tables 4 and 5.

However, with respect to one wherein bleeding out was observed on the coating film, no evaluation was conducted. One where bleeding out was observed on the coating film was identified as "Bleed" in the column for "Coating film state" in Tables 4 and 5. One where no bleeding out was observed, was evaluated to be 0 (good) in the "Coating film state".

(Flip-Flop Value)

The flip-flop value at the coating film surface was measured by using a spectrocolorimeter CM-512m3A (manufactured by Konica Minolta Inc.).

(PCI Value)

The PCI value at the coating film surface was judged by using the smoothness visual judgement standard plates by PCI (Powder Coating Institute).

(Concealing Properties)

On black and white steel panels for hiding power tests (manufactured by METOPAC PANELS), the powder coating material was applied in the same manner as mentioned above (Preparation of test specimen), and the L value on the whiteboard and the L value on the blackboard were measured. From the results, the concealing rate (%) was calculated by L value on blackboard/L value on whiteboard×100. Color measurements were made by using a spectrophotometer SC-T manufactured by Suga Test Instruments Co., Ltd. From the results, the concealing properties were evaluated by the following standards.

○ (good): The concealing rate was at least 90%.

Δ (slightly poor): The concealing rate was at least 70% and less than 90%.

x (bad): The concealing rate was less than 70%.

(Accelerated Weather Resistance (Gloss Retention and Color Difference ΔE))

With respect to the test specimen, an accelerated weather resistance test was carried out for a testing time of 3,000 hours by means of an accelerated weathering tester in accordance with JIS B7753; 2007 (sunshine weatherometer system). Taking the 60° specular gloss value of the coating film before the test as 100%, the retention of the 60° specular gloss value of the coating film after the test (gloss retention) (%) was obtained. The 60° specular gloss value was measured by a gloss meter (micro-TRI-gloss, manufactured by BYK, incident reflection angle: 60°). Further, the color difference ΔE before and after the test was measured by a color difference meter (manufactured by Minolta: CR-300).

(Adhesion)

The coating film of the test specimen was cross-cut with 1 mm spacing into 100 squares, and an adhesive tape was affixed thereon, and then, at the time when the adhesive tape was peeled, the adhesion of the coating film was evaluated by the following standards, from the number n of squares that did not peel by the adhesive tape, among 100 squares, (n/100).

○ (good): n is at least 90. x (bad): n is 89 or less.

TABLE 4

| | | | SP value of resin or the like | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Blend (parts by mass) | Powder (X) | X-1 | 18.4 | 29.1 | 29.1 | 29.1 | — | — | — | 49.5 | 24 |
| | | X-2 | 17.8 | — | — | — | 48.5 | — | 48.5 | — | — |
| | | X-3 | 17.6 | — | — | — | — | 48.5 | — | — | — |
| | | X-4 | 18.4 | — | — | — | — | — | — | — | — |
| | | X-5 | 18.4/21.0 | — | — | — | — | — | — | — | — |
| | Powder (Y) | Y-1 | 22.8 | 67.9 | 67.9 | 67.9 | 48.5 | — | — | 49.5 | 56 |
| | | Y-2 | 28.8 | — | — | — | — | 48.5 | — | — | — |
| | | Y-3 | 18.8 | — | — | — | — | — | 48.5 | — | — |
| | | Y-4 | 22.8 | — | — | — | — | — | — | — | — |
| | Powder (P) | P-1 | 18.4/22.8 | — | — | — | — | — | — | — | — |
| | Metallic pigment (C) | C-1 | 21.0 | 3 | — | — | 3 | 3 | 3 | 1 | 20 |
| | | C-2 | 21.0 | — | 3 | — | — | — | — | — | — |
| | | C-3 | 18.4 | — | — | 3 | — | — | — | — | — |
| | Fine particles (E) | | — | — | — | — | — | — | — | — | — |
| Evaluation results | Flip-flop value | | | 1.3 | 1.2 | 1.5 | 1.3 | 1.2 | 1.4 | 1.2 | 1.6 |
| | PCI value | | | 8 | 8 | 8 | 9 | 9 | 8 | 8 | 8 |
| | Concealing properties (%) | | | 92 | 90 | 91 | 91 | 92 | 93 | 90 | 98 |
| | | | | ○ | ○ | ○ | ○ | ○ | ○ | ○ | ○ |
| | Accelerated weather resistance (glass retention %) | | | 85 | 83 | 84 | 88 | 82 | 85 | 81 | 80 |
| | Accelerated weather resistance (color difference ΔE value) | | | 2.7 | 2.6 | 2.9 | 2.1 | 2.5 | 2.9 | 1.9 | 2.8 |
| | Adhesion | | | 100/100 | 100/100 | 100/100 | 100/100 | 100/100 | 100/100 | 100/100 | 100/100 |
| | | | | ○ | ○ | ○ | ○ | ○ | ○ | ○ | ○ |
| | Coating film state | | | ○ | ○ | ○ | ○ | ○ | ○ | ○ | ○ |

TABLE 5

| | | | SP value of resin or the like | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|
| Blend (parts by mass) | Powder (X) | X-1 | 18.4 | — | — | 29.3 | 22.5 | — | 3 | 97 | — |
| | | X-2 | 17.8 | — | — | — | — | — | — | — | — |
| | | X-3 | 17.6 | — | — | — | — | — | — | — | — |
| | | X-4 | 18.4 | — | 27.0 | — | — | 29.1 | — | — | — |
| | | X-5 | 18.4/21.0 | — | — | — | — | — | — | — | 32.1 |
| | Powder (Y) | Y-1 | 22.8 | — | — | 70.2 | 52.5 | — | 94 | — | — |
| | | Y-2 | 28.8 | — | — | — | — | — | — | — | — |
| | | Y-3 | 18.8 | — | — | — | — | — | — | — | — |
| | | Y-4 | 22.8 | — | 63.0 | — | — | 67.9 | — | — | 67.9 |
| | Powder (P) | P-1 | 18.4/22.8 | 97 | — | — | — | — | — | — | — |
| | Metallic | C-1 | 21.0 | 3 | 3 | 0.5 | 25 | 3 | 3 | 3 | — |

TABLE 5-continued

| | | SP value of resin or the like | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| | pigment (C) C-2 | 21.0 | — | — | — | — | — | — | — | — |
| | C-3 | 18.4 | — | — | — | — | — | — | — | — |
| | Fine particles (E) | — | — | 7 | — | — | — | — | — | — |
| Evaluation results | Flip-flop value | | 1.4 | 1.2 | 1.5 | — | 1.1 | 1.0 | — | 1.1 |
| | PCI value | | 8 | 6 | 8 | — | 5 | 8 | — | 8 |
| | Concealing properties (%) | | 92 | 93 | 62 | — | 82 | 66 | — | 68 |
| | | | ○ | ○ | x | — | x | x | — | x |
| | Accelerated weather resistance (glass retention %) | | 87 | 81 | 67 | — | 77 | 23 | — | 36 |
| | Accelerated weather resistance (color difference ΔE value) | | 2.6 | 2.8 | 3.8 | — | 3.5 | 8.3 | — | 5.4 |
| | Adhesion | | 100/100 | 100/100 | 100/100 | — | 100/100 | 0/100 | — | 100/100 |
| | | | ○ | ○ | ○ | — | ○ | x | — | ○ |
| | Coating film state | | ○ | ○ | ○ | Bleed | ○ | ○ | Bleed | ○ |

As shown in the above results, the coating films in Ex. 1 to 10 were excellent in weather resistance. Further, they were excellent also in concealing properties and in adhesion to substrates.

The coating film in Ex. 11 wherein the content of the metallic pigment (C) was less than 0.7 mass %, the coating film in Ex. 13 wherein the flip-flop value was less than 1.2 and the PCI value was less than 6, and the coating film in Ex. 14 wherein the flip-flop value was less than 1.2, were each inferior in weather resistance. Further, each of them was poor also in concealing properties. Particularly, in Ex. 14, the result in adhesion to a substrate was also poor.

In the coating film in Ex. 12 wherein the content of the metallic pigment (C) exceeded 23 mass % and in the coating film of Ex. 15 containing no fluororesin (B), bleeding out was observed. Although the evaluation other than the color hue and adhesion was not conducted, since the metallic pigment (C) was exposed on the surface of the coating film, the weather resistance of these coating films was low.

The coating film in Ex. 16 using the powder (X-5) wherein the metallic pigment (C) was attached to the particle surface of the powder (X-1) by means of a binder, was inferior in weather resistance. Further, it was poor also in concealing properties. This is considered to be such that the binding force between the powder and the metallic pigment (C) was so strong that the metallic pigment was not sufficiently oriented.

INDUSTRIAL APPLICABILITY

The present invention is widely useful for coating of various products for e.g. construction, automobile, aircraft, electrical appliances, traffic lights, labels, etc., particularly for coating of products in the field where weather resistance is highly required.

This application is a continuation of PCT Application No. PCT/JP2016/076025, filed on Sep. 5, 2016, which is based upon and claims the benefit of priority from Japanese Patent Application No. 2015-175723 filed on Sep. 7, 2015. The contents of those applications are incorporated herein by reference in their entireties.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

What is claimed is:

1. A method for producing a coated article, the method comprising:
    applying a powder coating material comprising a fluororesin (A), a non-fluororesin (B) and a metallic pigment (C) to a surface of a substrate; then
    heating the substrate having the powder coating material applied, at a temperature of at least a glass transition temperature of the fluororesin (A) and the non-fluororesin (B); and then
    cooling to form a coating film on the substrate surface, to obtain the coated article,
    wherein:
    a content of the metallic pigment (C) is from 0.7 to 23 mass % relative to a total amount of the powder coating material;
    the powder coating material further comprises a plasticizer (D) having a cyclic hydrocarbon group in the molecule;
    a PCI value of the coating film is at least 6, where the PCI value is obtained based on smoothness of the coating film surface by comparison to smoothness visual judgement standard plates by Powder Coating Institute;
    a flip-flop value of the coating film is at least 1.2, where the flip-flop value is obtained by a quotient:
    "a brightness(25°) of light measured at an illumination angle of 25° and a light receiving angle of 0°, based on a direction (0°) perpendicular to the film surface"/
    "a brightness(75°) of light measured at an illumination angle of 75° and a light receiving angle of 0°, based on a direction perpendicular to the film surface".

2. The method for producing a coated article according to claim 1, wherein a difference between an SP value of the fluororesin (A) and an SP value of the non-fluororesin (B) (SP value of the non-fluororesin (B)–SP value of the fluororesin (A)) is at least 0.4 $(J/cm^3)^{1/2}$.

3. The method for producing a coated article according to claim 1, wherein a mass ratio (AB) of the fluororesin (A) to the non-fluororesin (B) in the powder coating material is from 90/10 to 10/90.

4. The method for producing a coated article according to claim 1, wherein the metallic pigment (C) comprises metal particles covered with a covering material.

5. The method for producing a coated article according to claim 4, wherein an SP value of the covering material exceeds an SP value of the fluororesin (A), and an SP value of the covering material is less than an SP value of the non-fluororesin (B).

6. The method for producing a coated article according to claim 1, wherein the plasticizer (D) has a melting point from 70 to 160° C.

7. The method for producing a coated article according to claim 1, wherein an amount of the plasticizer (D) is from 0.1 to 40 parts by mass to 100 parts by mass relative to a total mass of the resin component contained in the powder coating material.

8. The method for producing a coated article according to claim 1, wherein the powder coating material further comprises fine particles (E) of at least one selected from the group consisting of silica, alumina, titania and zinc oxide, said fine particles (E) having a specific surface area of from 10 to 500 $m^2/g$ and an average primary particle size of from 0.1 to 100 nm.

9. The method for producing a coated article according to claim 8, wherein an amount of the fine particles (E) is from 0.01 to 10 parts by mass to 100 parts by mass relative to a total mass of resin component contained in the powder coating material.

10. The method for producing a coated article according to claim 1, wherein the substrate having the powder coating material applied, is heated at from 120 to 300° C., and then, cooled by quenching or annealing to from 20 to 25° C.

\* \* \* \* \*